US012708171B2

(12) United States Patent
Yang et al.

(10) Patent No.: US 12,708,171 B2
(45) Date of Patent: Aug. 18, 2026

(54) INJECTION PHYSICAL FOAMING INNER BOOT AND METHOD OF MANUFACTURING INNER BOOT BY INJECTION PHYSICAL FOAMING

(71) Applicant: FENG TAY ENTERPRISES CO., LTD., Yunlin County (TW)

(72) Inventors: Tsung-Lin Yang, Yunlin County (TW); Yu-Ta Chang, Changhua County (TW)

(73) Assignee: FENG TAY ENTERPRISES CO., LTD., Yunlin County (TW)

( * ) Notice: Subject to any disclaimer, the term of this patent is extended or adjusted under 35 U.S.C. 154(b) by 0 days.

(21) Appl. No.: 19/026,514

(22) Filed: Jan. 17, 2025

(65) Prior Publication Data

US 2026/0206909 A1 Jul. 23, 2026

(51) Int. Cl.
*A43B 5/04* (2006.01)
*A43B 9/02* (2006.01)
(Continued)

(52) U.S. Cl.
CPC .......... *A43B 5/0405* (2013.01); *A43B 5/0482* (2013.01); *A43B 9/02* (2013.01);
(Continued)

(58) Field of Classification Search
None
See application file for complete search history.

(56) References Cited

U.S. PATENT DOCUMENTS 3,823,493 A * 7/1974 Brehm .................... A43B 3/02 36/109
3,950,483 A * 4/1976 Spier .................... B29C 45/164 264/DIG. 83

(Continued)

FOREIGN PATENT DOCUMENTS

AT 305085 B * 2/1973
CN 1554301 A * 12/2004

(Continued)

OTHER PUBLICATIONS

Machine Translation of FR2644044A1, Sep. 1990 (Year: 1990).*

(Continued)

*Primary Examiner* — Jeffrey A Vonch
(74) *Attorney, Agent, or Firm* — Apex Juris, pllc; Cera Oh

(57) ABSTRACT

An injection physical foaming inner boot includes a shaft portion and a foot portion including a forefoot section and a hindfoot section. A hardness of the forefoot section is greater than a hardness of the hindfoot section. The shaft portion extends upwards from the hindfoot section of the foot portion. The foot portion and the shaft portion are integrally formed. Both the foot portion and the shaft portion include a thermoplastic material and do not include a crosslinking agent and a chemical foaming agent. Both a specific gravity of the foot portion and a specific gravity of the shaft portion are 0.1~0.3 g/cm$^3$. The hardness of the forefoot section is greater than a hardness of the shaft portion. A method of manufacturing an inner boot by injection physical foaming (Continued)

is provided. The injection physical foaming inner boot could be obtained through a single foaming process, thereby improving the production efficiency.

14 Claims, 10 Drawing Sheets

(51) Int. Cl.

| | |
|---|---|
| ***A43B 23/07*** | (2006.01) |
| ***B29C 44/04*** | (2006.01) |
| ***B29C 44/14*** | (2006.01) |
| ***B32B 1/00*** | (2024.01) |
| ***B32B 1/08*** | (2006.01) |
| ***B32B 5/02*** | (2006.01) |
| ***B32B 5/04*** | (2006.01) |
| ***B32B 5/14*** | (2006.01) |
| ***B32B 5/18*** | (2006.01) |
| ***B32B 5/24*** | (2006.01) |
| ***B32B 7/09*** | (2019.01) |
| ***B32B 27/12*** | (2006.01) |
| *A43B 3/04* | (2006.01) |
| *B29C 44/12* | (2006.01) |
| *B29D 35/00* | (2010.01) |
| *B29D 35/02* | (2010.01) |
| *B29D 35/04* | (2010.01) |
| *B29D 35/12* | (2010.01) |
| *B29D 35/14* | (2010.01) |
| *B29K 105/04* | (2006.01) |
| *B29L 31/50* | (2006.01) |
| *B32B 7/04* | (2019.01) |
| *B32B 27/32* | (2006.01) |
| *B32B 27/34* | (2006.01) |
| *B32B 27/36* | (2006.01) |
| *B32B 27/40* | (2006.01) |
| *C08J 9/12* | (2006.01) |

(52) U.S. Cl.

CPC .............. *A43B 23/07* (2013.01); *B29C 44/04* (2013.01); *B29C 44/0446* (2013.01); *B29C 44/0461* (2013.01); *B29C 44/14* (2013.01); *B29C 44/145* (2013.01); *B32B 1/00* (2013.01); *B32B 5/02* (2013.01); *B32B 5/04* (2013.01); *B32B 5/145* (2013.01); *B32B 5/18* (2013.01); *B32B 5/245* (2013.01); *B32B 7/09* (2019.01); *A43B 3/04* (2013.01); *A43B 5/04* (2013.01); *B29C 44/0476* (2013.01); *B29C 44/0492* (2013.01); *B29C 44/12* (2013.01); *B29C 44/1214* (2013.01); *B29C 44/1271* (2013.01); *B29C 44/1276* (2013.01); *B29D 35/0009* (2013.01); *B29D 35/02* (2013.01); *B29D 35/04* (2013.01); *B29D 35/12* (2013.01); *B29D 35/14* (2013.01); *B29K 2105/04* (2013.01); *B29K 2995/0064* (2013.01); *B29K 2995/007* (2013.01); *B29L 2031/50* (2013.01); *B29L 2031/501* (2013.01); *B32B 1/08* (2013.01); *B32B 7/04* (2013.01); *B32B 27/12* (2013.01); *B32B 27/32* (2013.01); *B32B 27/34* (2013.01); *B32B 27/36* (2013.01); *B32B 27/40* (2013.01); *B32B 2305/022* (2013.01); *B32B 2307/722* (2013.01); *B32B 2437/02* (2013.01); *C08J 9/122* (2013.01); *C08J 2203/06* (2013.01); *C08J 2203/08* (2013.01); *Y10T 428/1362* (2015.01); *Y10T 428/1376* (2015.01); *Y10T 428/2495* (2015.01); *Y10T 428/24983* (2015.01); *Y10T 428/24992* (2015.01); *Y10T 428/249953* (2015.04)

(56) References Cited

U.S. PATENT DOCUMENTS

| | | | | | |
|---|---|---|---|---|---|
| 3,958,291 | A * | 5/1976 | Spier | B29D 35/082 | 12/142 RS |
| 4,245,410 | A * | 1/1981 | Molitor | A43B 5/04 | 493/309 |
| 4,414,762 | A * | 11/1983 | Salomon | B29D 35/064 | 12/142 P |
| 4,910,889 | A * | 3/1990 | Bonaventure | A43B 5/0405 | 36/117.6 |
| 5,067,257 | A * | 11/1991 | Coomer | A43B 5/0405 | 36/117.6 |
| 5,184,411 | A * | 2/1993 | Corletto | A43B 5/0405 | 36/117.6 |
| 5,323,548 | A * | 6/1994 | Vogel | A43B 5/0456 | 36/118.4 |
| 5,339,545 | A * | 8/1994 | Paris | A43B 19/00 | 36/117.6 |
| 5,617,745 | A * | 4/1997 | Della Corte | A41B 11/003 | 602/65 |
| 5,673,448 | A * | 10/1997 | Lang | A43B 19/00 | 36/117.6 |
| 5,682,686 | A * | 11/1997 | Condini | A43B 5/0405 | 36/117.6 |
| 6,292,951 | B1 * | 9/2001 | Kalde | D04B 1/26 | 2/241 |
| 6,539,648 | B1 * | 4/2003 | Collavo | A43B 7/12 | 36/119.1 |
| 2002/0004997 | A1 * | 1/2002 | Pizzamiglio | A43B 9/00 | 36/51 |
| 2002/0071946 | A1 * | 6/2002 | Norton | A43B 23/026 | 428/304.4 |
| 2004/0168357 | A1 * | 9/2004 | Meibock | A43B 1/0072 | 36/115 |
| 2005/0166423 | A1 * | 8/2005 | Norton | B29C 44/0407 | 36/144 |
| 2005/0241189 | A1 * | 11/2005 | Elkington | A43B 11/00 | 36/117.6 |
| 2006/0090376 | A1 * | 5/2006 | Perotto | A43B 7/34 | 36/117.6 |
| 2007/0204482 | A1 * | 9/2007 | Gibson-Collinson | A43B 7/125 | 36/55 |
| 2009/0307930 | A1 * | 12/2009 | Perizzolo | A43B 5/0482 | 12/142 P |
| 2010/0095557 | A1 * | 4/2010 | Jarvis | A43B 13/41 | 36/114 |
| 2010/0156058 | A1 * | 6/2010 | Koyess | A43B 5/16 | 12/142 P |
| 2011/0035966 | A1 | 2/2011 | Geer et al. | | |
| 2011/0067271 | A1 * | 3/2011 | Foxen | A43B 13/16 | 36/131 |
| 2016/0177048 | A1 * | 6/2016 | Topolkaraev | C08L 23/0884 | 521/134 |
| 2017/0181494 | A1 * | 6/2017 | Yamada | A43B 5/0409 | |
| 2017/0325545 | A1 * | 11/2017 | Becker | A43B 7/14 | |
| 2021/0079188 | A1 * | 3/2021 | Baghdadi | A43B 13/26 | |

FOREIGN PATENT DOCUMENTS

| | | | | |
|---|---|---|---|---|
| CN | 204273380 | U * | 4/2015 | |
| CN | 212661203 | U * | 3/2021 | |
| CN | 118181627 | A * | 6/2024 | B29C 44/06 |
| CN | 118766188 | A | 10/2024 | |
| DE | 1955615 | A1 * | 5/1971 | |
| DE | 2159526 | A1 * | 8/1973 | |
| DE | 2300602 | A1 * | 7/1974 | |
| DE | 3924240 | A1 * | 6/1990 | A43B 5/0409 |
| DE | 4401849 | A1 * | 8/1994 | A43B 5/0405 |
| EP | 0107841 | A1 * | 5/1984 | A43B 5/0405 |

(56) References Cited

FOREIGN PATENT DOCUMENTS

| | | | | | |
|---|---|---|---|---|---|
| EP | 0279074 | A1 | * | 8/1988 | A43B 5/0405 |
| EP | 0351396 | A2 | | 1/1990 | |
| EP | 0702907 | A1 | * | 3/1996 | A43B 5/0405 |
| EP | 0715818 | A1 | * | 6/1996 | A43B 19/00 |
| EP | 2042050 | A1 | * | 4/2009 | A43B 5/0405 |
| EP | 2132998 | A1 | * | 12/2009 | A43B 5/0405 |
| EP | 2198728 | A1 | * | 6/2010 | A63C 3/02 |
| EP | 2210513 | A2 | * | 7/2010 | A43B 5/0417 |
| EP | 2901878 | A1 | * | 8/2015 | B32B 25/10 |
| EP | 3050454 | A1 | * | 8/2016 | A43B 19/00 |
| EP | 3446586 | A1 | * | 2/2019 | B29C 41/02 |
| FR | 1380525 | A1 | * | 12/1964 | |
| FR | 2265294 | A1 | * | 10/1975 | |
| FR | 2348665 | A1 | * | 11/1977 | |
| FR | 2644044 | A1 | * | 9/1990 | A43B 5/0405 |
| IT | UD940197 | A1 | * | 6/1996 | B29D 35/04 |
| IT | 202300005307 | A1 | * | 9/2024 | A43D 3/027 |
| JP | S5711602 | A | * | 1/1982 | |
| JP | S5922501 | A | * | 2/1984 | |
| JP | S60130704 | U | * | 9/1985 | |
| JP | S61203902 | A | * | 9/1986 | |
| JP | H0295388 | A | * | 4/1990 | |
| JP | H02239802 | A | * | 9/1990 | |
| JP | H0386102 | A | * | 4/1991 | |
| JP | H057501 | A | * | 1/1993 | |
| JP | H07195583 | A | * | 8/1995 | |
| JP | H08280411 | A | * | 10/1996 | |
| JP | 2000229001 | A | * | 8/2000 | |
| KR | 20160017137 | A | * | 2/2016 | A43B 23/02 |
| TW | 202430365 | A | | 8/2024 | |
| WO | WO-9009745 | A1 | * | 9/1990 | B29D 35/02 |
| WO | WO-9409663 | A1 | * | 5/1994 | A43B 19/00 |
| WO | 2005096859 | A1 | | 10/2005 | |
| WO | WO-2017136942 | A1 | * | 8/2017 | B29D 35/081 |
| WO | WO-2023227178 | A1 | * | 11/2023 | B29D 35/061 |
| WO | WO-2024079406 | A1 | * | 4/2024 | B29C 44/332 |

OTHER PUBLICATIONS

Machine Translation of WO2024079406A1, Apr. 2024 (Year: 2024).*

Search Report for TW113143470, Issued on Jun. 30, 2025, Total of 5 pages including the English translation.

Search Report for EP25153331.1, Issued on Jul. 2, 2025, Total of 2 pages.

Abstract of TW202430365A in English, Total of 1 page.

Abstract of CN118766188A in English, Total of 1 page.

* cited by examiner

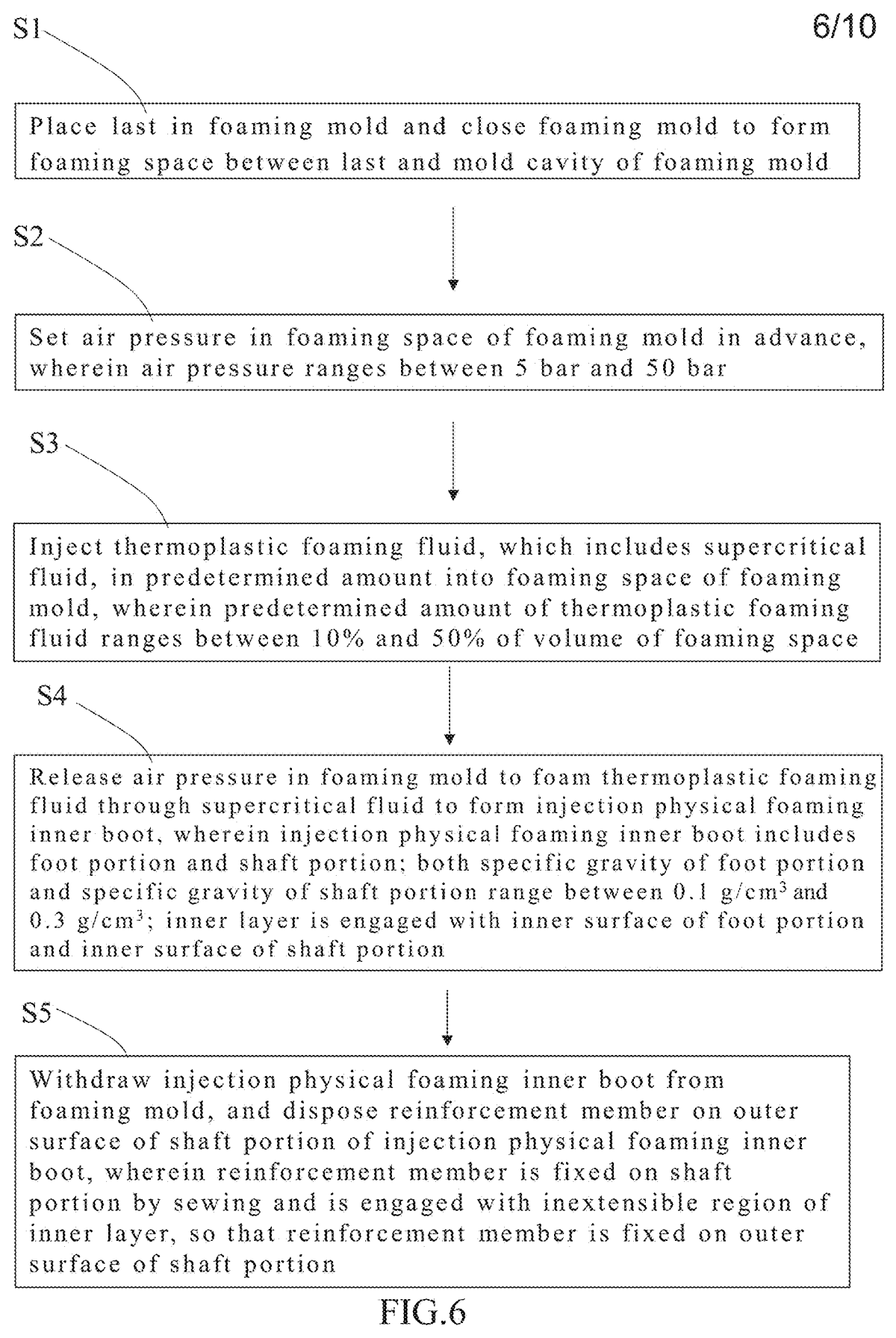

S1

Place last in foaming mold and close foaming mold to form foaming space between last and mold cavity of foaming mold

S2

Set air pressure in foaming space of foaming mold in advance, wherein air pressure ranges between 5 bar and 50 bar

S3

Inject thermoplastic foaming fluid, which includes supercritical fluid, in predetermined amount into foaming space of foaming mold, wherein predetermined amount of thermoplastic foaming fluid ranges between 10% and 50% of volume of foaming space

S4

Release air pressure in foaming mold to foam thermoplastic foaming fluid through supercritical fluid to form injection physical foaming inner boot, wherein injection physical foaming inner boot includes foot portion and shaft portion; both specific gravity of foot portion and specific gravity of shaft portion range between 0.1 g/cm$^3$ and 0.3 g/cm$^3$; inner layer is engaged with inner surface of foot portion and inner surface of shaft portion

S5

Withdraw injection physical foaming inner boot from foaming mold, and dispose reinforcement member on outer surface of shaft portion of injection physical foaming inner boot, wherein reinforcement member is fixed on shaft portion by sewing and is engaged with inextensible region of inner layer, so that reinforcement member is fixed on outer surface of shaft portion

FIG.6

INJECTION PHYSICAL FOAMING INNER BOOT AND METHOD OF MANUFACTURING INNER BOOT BY INJECTION PHYSICAL FOAMING

BACKGROUND OF THE INVENTION

Technical Field

The present invention relates generally to an inner boot structure and a manufacturing technology, and more particularly to an injection physical foaming inner boot and a method of manufacturing an inner boot by injection physical foaming.

Description of Related Art

A boot with a shaft used in daily life and sport, such as snow boots, ski boots, ice skates, inline skates, etc., is typically composed of an inner boot and an outer boot. The inner boot is mounted on an inner side of the outer boot and is adapted to tightly enclose a foot of a user, thereby improving the comfortability and the stability during wearing.

A ski boot is used as an example. A conventional inner boot is formed by sewing a plurality of fabrics, lasting the sewed fabrics, and adhering a bottom component. Such complicated procedures increase the processing cost of the inner boot. Moreover, skiing is an intensive exercise. When a user wears the ski boot to ski, a sewed connection between two adjacent fabrics in the conventional inner boot might be broken due to wear and tear caused by exercising, reducing the durability of the conventional inner boot. Additionally, the weight of the conventional inner boot could not be reduced due to the sewed structure of the conventional inner boot. In practice, the conventional inner boot might not tightly conform to a foot shape of the user, thereby affecting the comfortability and flexibility while wearing the conventional inner boot to perform skiing.

In order to solve the problems of the conventional inner boot, a foamed inner boot that is integrally formed is provided. The foamed inner boot could improve the production efficiency and could more tightly conform the foot shape of the user than the conventional inner boot, thereby improving the comfortability of the foamed inner boot. However, the foamed inner boot still has drawbacks. For example, the foamed inner boot is integrally formed by chemical foaming in general, wherein a crosslinking agent is generally added to the foamed inner boot, so that crosslinking of polymers in the foamed inner boot is generated to form a mesh structure. As a crosslinked structure of the foamed inner boot could not be broken down easily, a waste foamed inner boot could not be recycled and reused in general. The waste foamed inner boot that is non-recyclable could only be disposed of through incineration, which causes pollution.

BRIEF SUMMARY OF THE INVENTION

In view of the above, the primary objective of the present invention is to provide an injection physical foaming inner boot and a method of manufacturing an inner boot by injection physical foaming, wherein the injection physical foaming inner boot is integrally formed, so that the weight of the injection physical foaming inner boot could be reduced and the comfortability during wearing the injection physical foaming inner boot could be enhanced. Moreover, the injection physical foaming inner boot could be recycled to manufacture a unfoamed raw material for reusing in an injection physical foaming process, thereby contributing to environmental protection.

The present invention provides an injection physical foaming inner boot, including a foot portion and a shaft portion. The foot portion includes a forefoot section and a hindfoot section. The hardness of the forefoot section is greater than a hardness of the hindfoot section. The shaft portion extends upwards from the hindfoot section of the foot portion. The foot portion and the shaft portion are integrally formed. Both the foot portion and the shaft portion include a thermoplastic material and do not include a crosslinking agent and a chemical foaming agent. a specific gravity of the foot portion and a specific gravity of the shaft portion range between 0.1 g/cm$^3$ and 0.3 g/cm$^3$. The hardness of the forefoot section is greater than a hardness of the shaft portion.

The present invention further provides a method of manufacturing an inner boot by injection physical foaming, comprising:

- Step S1: placing a last in a foaming mold and closing the foaming mold to form a foaming space between the last and a mold cavity of the foaming mold;
- Step S2: setting an air pressure in the foaming space of the foaming mold in advance, wherein the air pressure ranges between 5 bar and 50 bar
- Step S3: injecting a thermoplastic foaming fluid, which includes a supercritical fluid, in a predetermined amount into the foaming space of the foaming mold, wherein the predetermined amount ranges between 10% and 50% of a volume of the foaming space; and
- Step S4: releasing the air pressure in the foaming mold to foam the thermoplastic foaming fluid through the supercritical fluid to form an injection physical foaming inner boot, wherein the injection physical foaming inner boot includes a foot portion and a shaft portion; both a specific gravity of the foot portion and a specific gravity of the shaft portion range between 0.1 g/cm$^3$ and 0.3 g/cm$^3$.

With the aforementioned design, the foot portion and the shaft portion of injection physical foaming inner boot are integrally formed through injection physical foaming, so that the foot portion and the shaft portion are light in weight, thereby improving the comfortability and flexibility while wearing the injection physical foaming inner boot to exercise. Moreover, both the foot portion and the shaft portion do not include a crosslinking agent and a chemical foaming agent, so that both the foot portion and the shaft portion of the injection physical foaming inner boot could be recycled and reused to form the thermoplastic material, thereby reducing the production of non-recyclable waste and contributing to environmental protection.

Additionally, the method of manufacturing the inner boot by injection physical foaming could obtain the injection physical foaming inner boot in a single foaming process through performing physical foaming by using the supercritical fluid. In this way, processing procedures, such as roughening surfaces, applying an adhesive, attaching a sole, could be avoided, thereby improving the production efficiency and increasing the yield rate of the injection physical foaming inner boot. Moreover, the method of manufacturing the inner boot by injection physical foaming does not include a crosslinking agent, so that the foot portion and the shaft portion of the injection physical foaming inner boot could be directly recycled and reused and non-recyclable waste produced during the manufacturing process could be reduced, thereby making the manufacturing process environmentally friendly.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 6 is a flowchart of the method of manufacturing the inner boot by injection physical foaming according to an embodiment of the present invention;

DETAILED DESCRIPTION OF THE INVENTION

Figure 1:
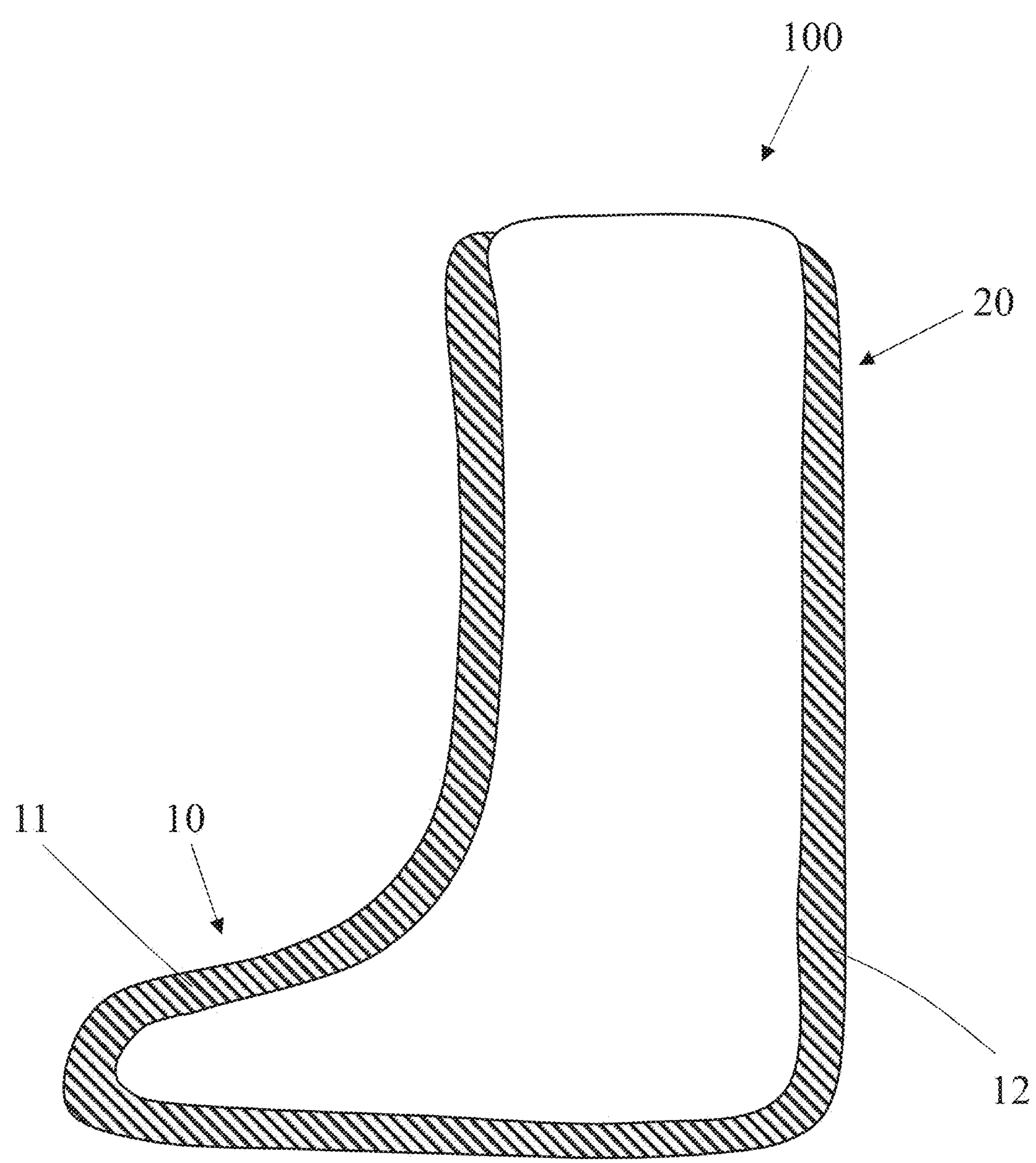
FIG. 1 is a sectional schematic view of the injection physical foaming inner boot according to a first embodiment of the present invention.

An injection physical foaming inner boot 100 according to a first embodiment of the present invention is illustrated in FIG. 1 and includes a foot portion 10 and a shaft portion 20. In the current embodiment, the foot portion 10 and the shaft portion 20 are integrally formed as a monolithic unit through physical foaming. In the current embodiment, the foot portion 10 and the shaft portion 20 are integrally formed as a monolithic unit through injection molding.

The foot portion 10 is adapted to enclose a foot and an ankle of a user. The foot portion 10 includes a forefoot section 11 and a hindfoot section 12. The forefoot section 11 correspondingly encloses a forefoot region and an instep region of the user. The hindfoot section 12 correspondingly encloses a heel region and an ankle region of the user. A hardness of the forefoot section 11 is greater than a hardness of the hindfoot section 12.

The shaft portion 20 extends upwards from the hindfoot section 12 of the foot portion 10 and is adapted to enclose a leg of the user. As the foot portion 10 and the shaft portion 20 are integrally foamed, a specific gravity of the foot portion 10 is approximately equal to a specific gravity of the shaft portion 20, wherein both the specific gravity of the foot portion 10 and the specific gravity of the shaft portion 20 range between 0.1 g/cm$^3$ and 0.3 g/cm$^3$, and the hardness of the forefoot section 11 is greater than a hardness of the shaft portion 20. In the current embodiment, both the foot portion 10 and the shaft portion 20 include a thermoplastic material and do not include a crosslinking agent and a chemical foaming agent; the thermoplastic material is selected from a group consisting of polyolefin, polyester, thermoplastic polyurethane (TPU), nylon, and a combination thereof.

A way to make the hardness of the forefoot section 11 greater than the hardness of the hindfoot section 12 and greater than the hardness of the shaft portion 20 is explained as below. For example, when a thermoplastic material of the forefoot section 11, a thermoplastic material of the hindfoot section 12, and the thermoplastic material of the shaft portion 20 are identical, an average thickness of the forefoot section 11 is designed to be less than an average thickness of the hindfoot section 12 and less than an average thickness of the shaft portion 20, indicating that a pore density of the forefoot section 11 generated by foaming is high, and both a pore density of the hindfoot section 12 and a pore density of the shaft portion 20 generated by foaming are less than the pore density of the forefoot section 11; in this way, the hardness of the forefoot section 11 is greater than the hardness of the hindfoot section 12 and greater than the hardness of the shaft portion 20. Alternatively, a hardness of the thermoplastic material of the forefoot section 11 is greater than a hardness of the thermoplastic material of the hindfoot section 12 and greater than a hardness of the thermoplastic material of the shaft portion 20, wherein during injection foaming, the thermoplastic material of the forefoot section 11, the thermoplastic material of the hindfoot section 12, and the thermoplastic material of the shaft portion 20 are respectively injected into a foaming mold by independent injection barrels for physical foaming.

In this way, the foot portion 10 and the shaft portion 20 of the injection physical foaming inner boot 100 are integrally formed as a monolithic unit through injection physical foaming, so that the foot portion 10 and the shaft portion 20 could be light in weight, thereby improving the comfortability and flexibility during exercise with the injection physical foaming inner boot 100. Moreover, both the foot portion 10 and the shaft portion 20 do not include a crosslinking agent and a chemical foaming agent, so that the foot portion 10 and the shaft portion 20 of the injection physical foaming inner boot 100 could be cycled and comminuted to produce a unfoamed raw material, and the unfoamed raw material is recycled as the thermoplastic material, thereby reducing the production of non-recyclable waste and contributing to environmental protection.

Figure 2:
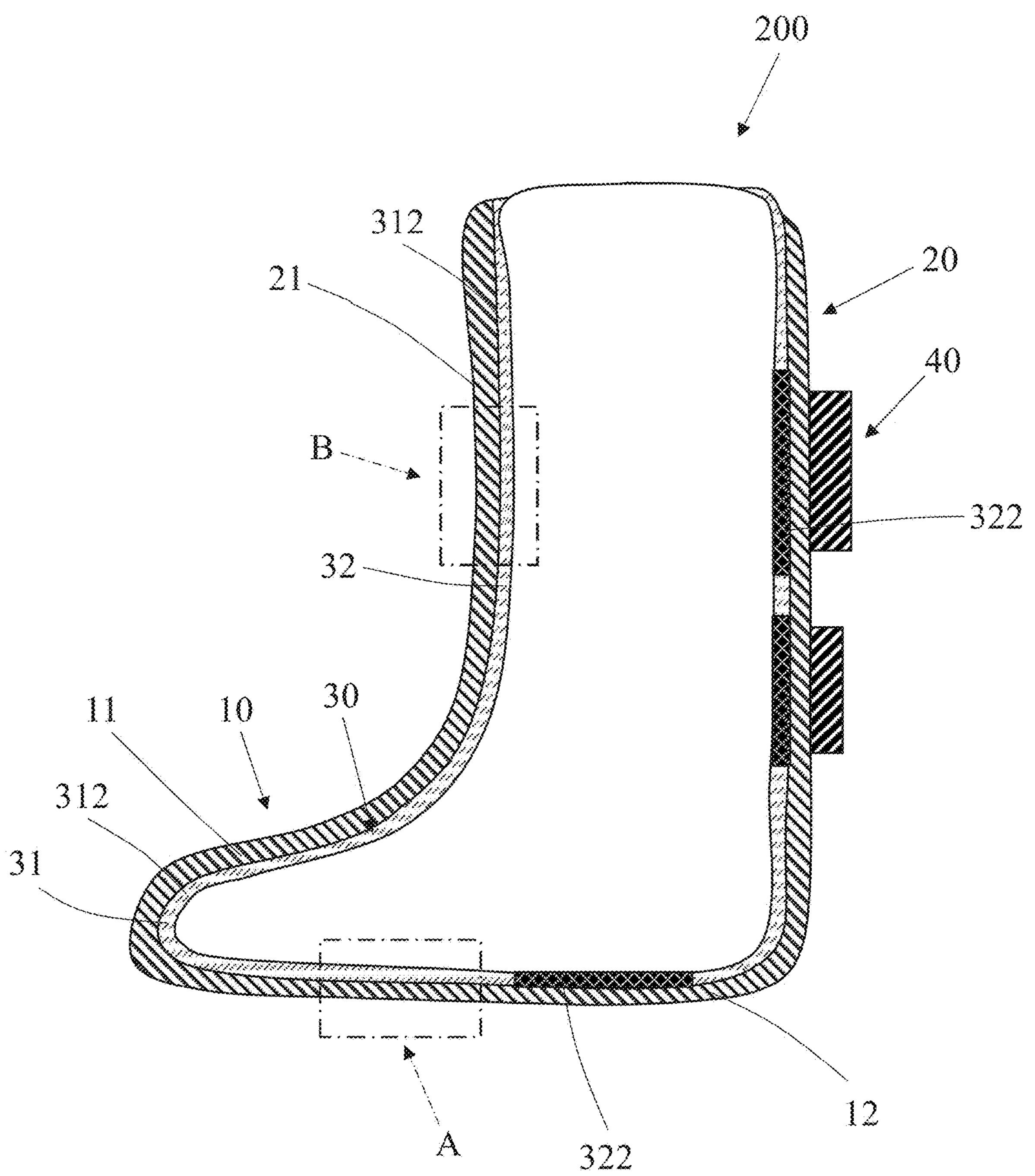
FIG. 2 is a sectional schematic view of the injection physical foaming inner boot according to a second embodiment of the present invention.

An injection physical foaming inner boot 200 according to a second embodiment of the present invention is illustrated in FIG. 2 and includes the foot portion 10, the shaft portion 20, an inner layer 30, and a plurality of reinforcement members 40. A structure of the foot portion 10 and the shaft portion 20 of the second embodiment is almost identical to that of the first embodiment and is not repeated here.

Figure 3:
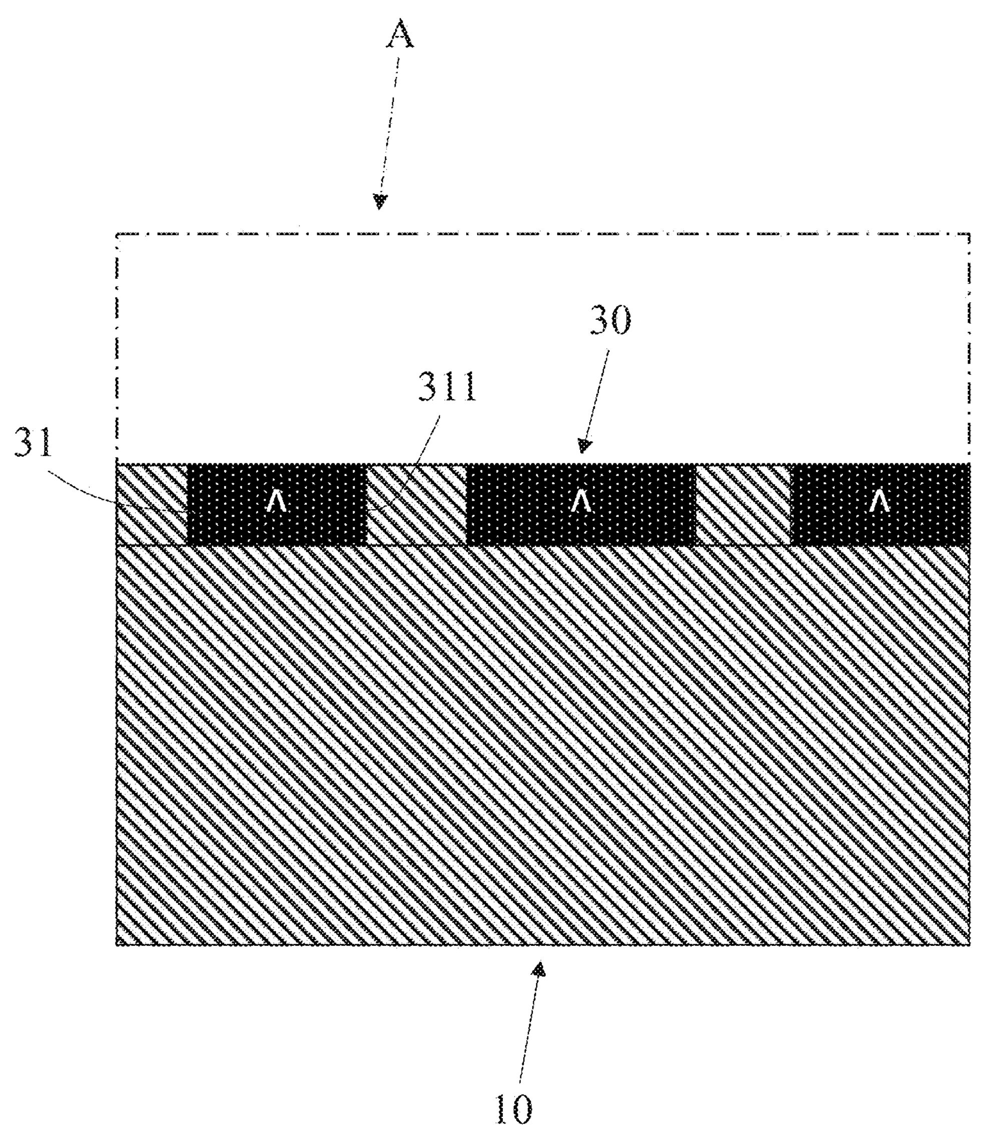
FIG. 3 is a partially enlarged view of a marked region A in FIG. 2.
Figure 4:
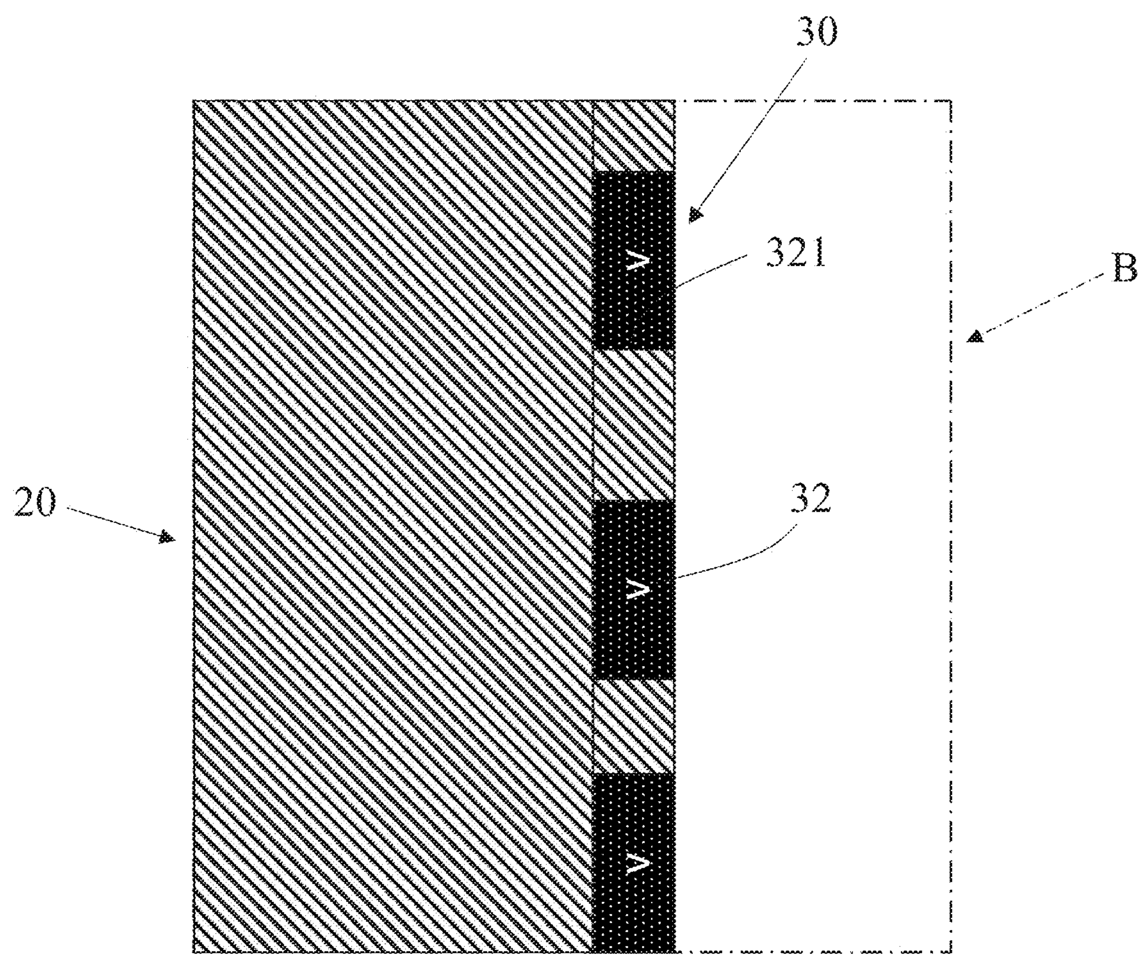
FIG. 4 is a partially enlarged view of a marked region B in FIG. 2.

The inner layer 30 is engaged with an inner side of the foot portion 10 and an inner side of the shaft portion 20. The inner layer 30 includes an inner foot section 31 and an inner shaft section 32. In the current embodiment, the inner layer 30 is a fabric made of fiber materials. The inner foot section 31 and the inner shaft section 32 are engaged to form a monolithic unit. Referring to FIG. 3, the inner layer 30 has a plurality of first pores 311 distributed on the inner foot section 31. The inner foot section 31 is correspondingly engaged with an inner surface of the foot portion 10. A part of the foot portion 10 enters the first pores 311 of the inner foot section 31 to generate a fitting effect, so that the inner foot section 31 and the foot portion 10 generate an anchor effect to be attached to each other. Referring to FIG. 4, the inner layer 30 has a plurality of second pores 321 distributed on the inner shaft section 32. The inner shaft section 32 is correspondingly engaged with an inner surface of the shaft portion 20. A part of the shaft portion 20 enters the second pores 321 of the inner shaft section 32 to generate a fitting effect, so that the inner shaft section 32 and the shaft portion 20 generate an anchor effect to be attached to each other.

An extensible region 312 and an inextensible region 322 are defined on the inner layer 30. The extensible region 312 and the inextensible region 322 are distributed on the inner foot section 31 and the inner shaft section 32. In the current embodiment, a tensile strength of the inextensible region 322 is greater than a tensile strength of the extensible region 312. The extensible region 312 is distributed on a part of the inner shaft section 32 and a part of the inner foot section 31. The inextensible region 322 is distributed on another part of the inner shaft section 32 and another part of the inner foot section 31. An area of the inextensible region 322 is less than an area of the extensible region 312. The inextensible region 322 of the inner shaft section 32 is larger than the inextensible region 322 of the inner foot section 31. In the current embodiment, the inner shaft section 32 is engaged with the inner surface of the shaft portion 20 through the extensible region 312 and the inextensible region 322 of the inner shaft section 32, and the inner foot section 31 is engaged with the inner surface of the foot portion 10 through the extensible region 312 and the inextensible region 322 of the inner foot section 31. More specifically, the extensible region 312 and the inextensible region 322 of the inner layer 30 are different weaving materials; for example, the extensible region 312 is polyester fibers, and the inextensible region 322 is thermoplastic polyurethane (TPU) fibers; in this way, the extensible region 312 and the inextensible region 322 have different tensile strengths and extension effects. Alternatively, the extensible region 312 and the inextensible region 322 are an identical weaving material; the extensible region 312 and the inextensible region 322 have different tensile strengths and extension effects due to different weaving ways.

The foot portion 10, the shaft portion 20, and the inner layer 30 are formed through co-molding, i.e., the inner layer 30 generates an anchor effect with the foot portion 10 through the first pores 311 and generates an anchor effect with the shaft portion 20 through the second pores 321 at the same time to attach to both the foot portion 10 and the shaft portion 20. In this way, a good attachment between the inner layer 30 and the foot portion 10 could be achieved without providing an adhesive layer between the inner foot section 31 and the foot portion 10, and a good attachment between the inner layer 30 and the shaft portion 20 could be achieved without providing an adhesive layer between the inner shaft section 32 and the shaft portion 20.

In other embodiments, a structure of the inner layer 30 could be adjusted to meet different requirements. For example, the inner foot section 31 and the inner shaft section 32 of the inner layer 30 could be separated, wherein the inner foot section 31 and the inner shaft section 32 are disposed on the inner side of the foot portion 10 and the inner side of the shaft portion 20, respectively; both the inner foot section 31 and the inner shaft section 32 of the inner layer 30 are provided with fabric loops, thereby improving engaging strengths between the inner layer 30 and the foot portion 10 and between the inner layer 30 and the shaft portion 20.

The reinforcement members 40 are disposed on an outer surface 21 of the shaft portion 20. In the current embodiment, the reinforcement members 40 are fixed on the shaft portion 20 through sewing and are engaged with the inextensible region 322 of the inner layer 30. The inextensible region 322 allows the reinforcement members 40 to be fixed on the outer surface 21 of the shaft portion 20. Moreover, the inextensible region 322 ensures that the shaft portion 20 has a sufficient strength to resist deformation caused by pulling and extending when the reinforcement members 40 are pulled and extended. If the reinforcement members 40 are correspondingly sewed on the extensible region 312 of the inner layer 30, the extensible region 312 does not provide a strong fixing effect due to high flexibility of the extensible region 312, reducing a fixing strength of the reinforcement member 40 sewed on the extensible region 312. Referring to FIG. 2, in other embodiments, the reinforcement members 40 could be correspondingly engaged with an outer surface of the foot portion 10 in correspondence with a position of the inextensible region 322. For example, the reinforcement members 40 could be fixed on the foot portion 10 through sewing and engaged with the inextensible region 322 of the inner foot section 31, so that the reinforcement members 40 are fixed on a sole 14 of the hindfoot section 12. The number of the reinforcement member 40 could be at least one; alternatively, the reinforcement members 40 could be omitted.

Therefore, the inner layer 30 is flatly and smoothly attached to the inner side of the foot portion 10 and the inner side of the shaft portion 20. In this way, when the user wears the injection physical foaming inner boot 200 or takes off the injection physical foaming inner boot 200, the inner layer 30 could reduce a friction with the foot and the leg of the user, so that the user could comfortably wear or take off the injection physical foaming inner boot 200, thereby improving the comfortability of the injection physical foaming inner boot 200. Moreover, the injection physical foaming inner boot 200 could reinforce a particular portion of the shaft portion 20 through mounting the reinforcement member 40 to meet different requirements.

Figure 5:
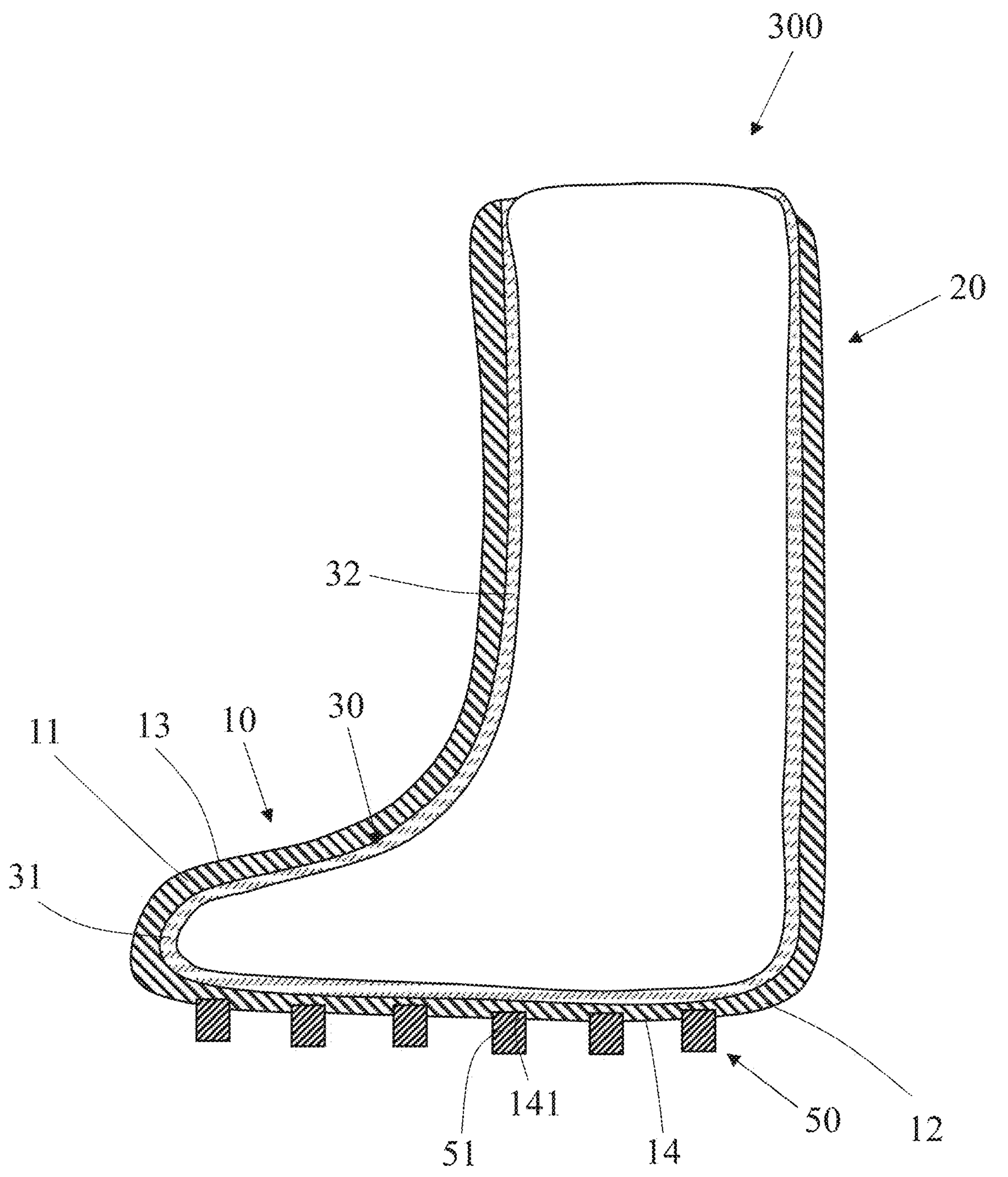
FIG. 5 is a sectional schematic view of the injection physical foaming inner boot according to a third embodiment of the present invention.

An injection physical foaming inner boot 300 according to a third embodiment of the present invention is illustrated in FIG. 5 and includes the foot portion 10, the shaft portion 20, the inner layer 30, and an anti-slip member 50. A structure of the foot portion 10, the shaft portion 20, and the inner layer 30 of the third embodiment is almost identical to that of the second embodiment and is not repeated here.

The anti-slip member 50 is disposed on the foot portion 10. The foot portion 10 has an upper 13 and a sole 14. The upper 13 is connected to a periphery of the sole 14. The anti-slip member 50 is engaged with a bottom surface of the sole 14 of the foot portion 10. In the current embodiment, the anti-slip member 50 is a plurality of anti-slip blocks 51, and a plurality of recesses 141 is distributed on the bottom surface of the sole 14. The anti-slip blocks 51 are correspondingly disposed on the recesses 141 and protrude outwards relative to the bottom surface of the sole 14, so that the user could directly wear the injection physical foaming inner boot 300. The anti-slip blocks 51 could be correspondingly fixed to the recesses 141 of the sole 14 through adhering. In the current embodiment, the anti-slip member 50 and the foot portion 10 are formed through co-molding, i.e., the anti-slip blocks 51 are fixed to the recesses 141 by the foot portion 10. The anti-slip member 50 of the injection physical foaming inner boot 300 has an anti-slip effect. Moreover, the anti-slip blocks 51 could be customized to be made of different materials for meeting different walking requirements, thereby improving the safety and comfortability of the injection physical foaming inner boot 300 during walking.

Figure 7:
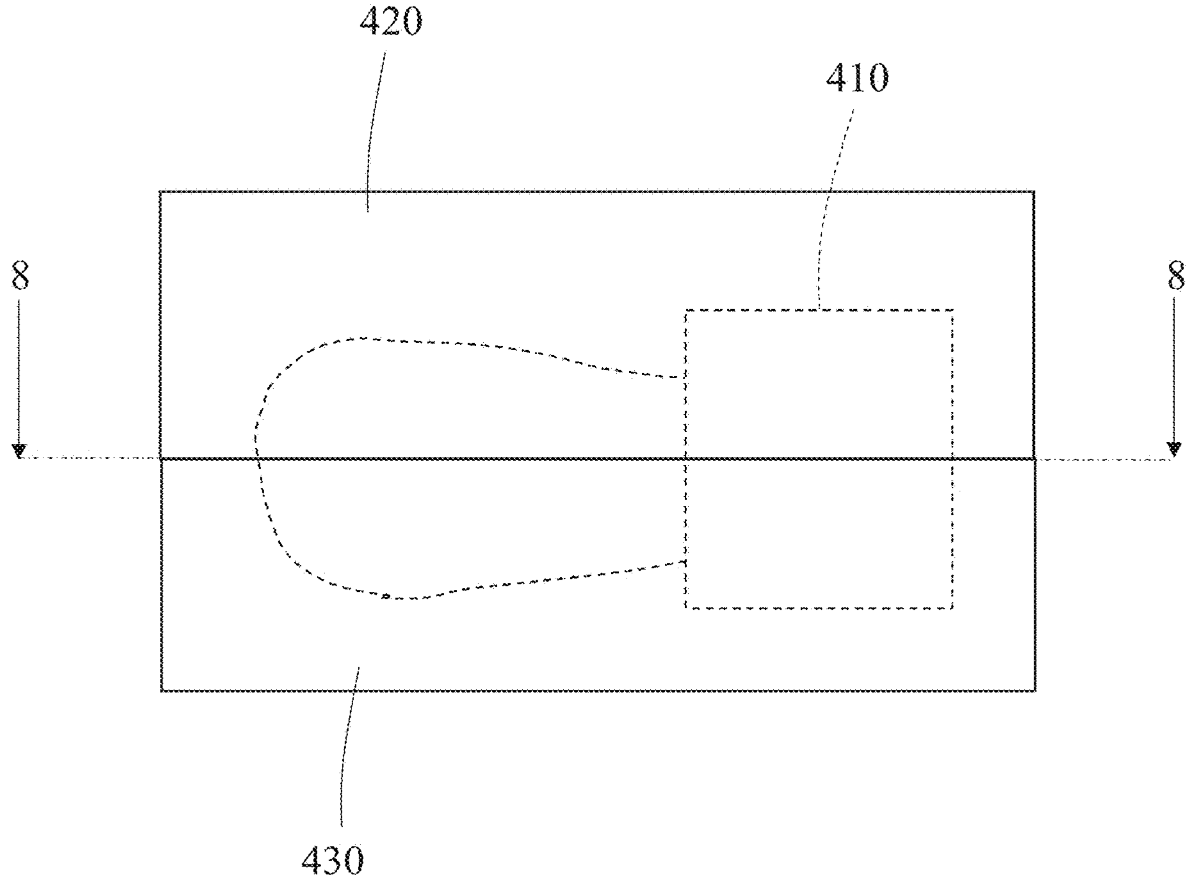
FIG. 7 is a top view of the foaming mold of the method of manufacturing the inner boot by injection physical foaming according to the embodiment of the present invention.
Figure 8:
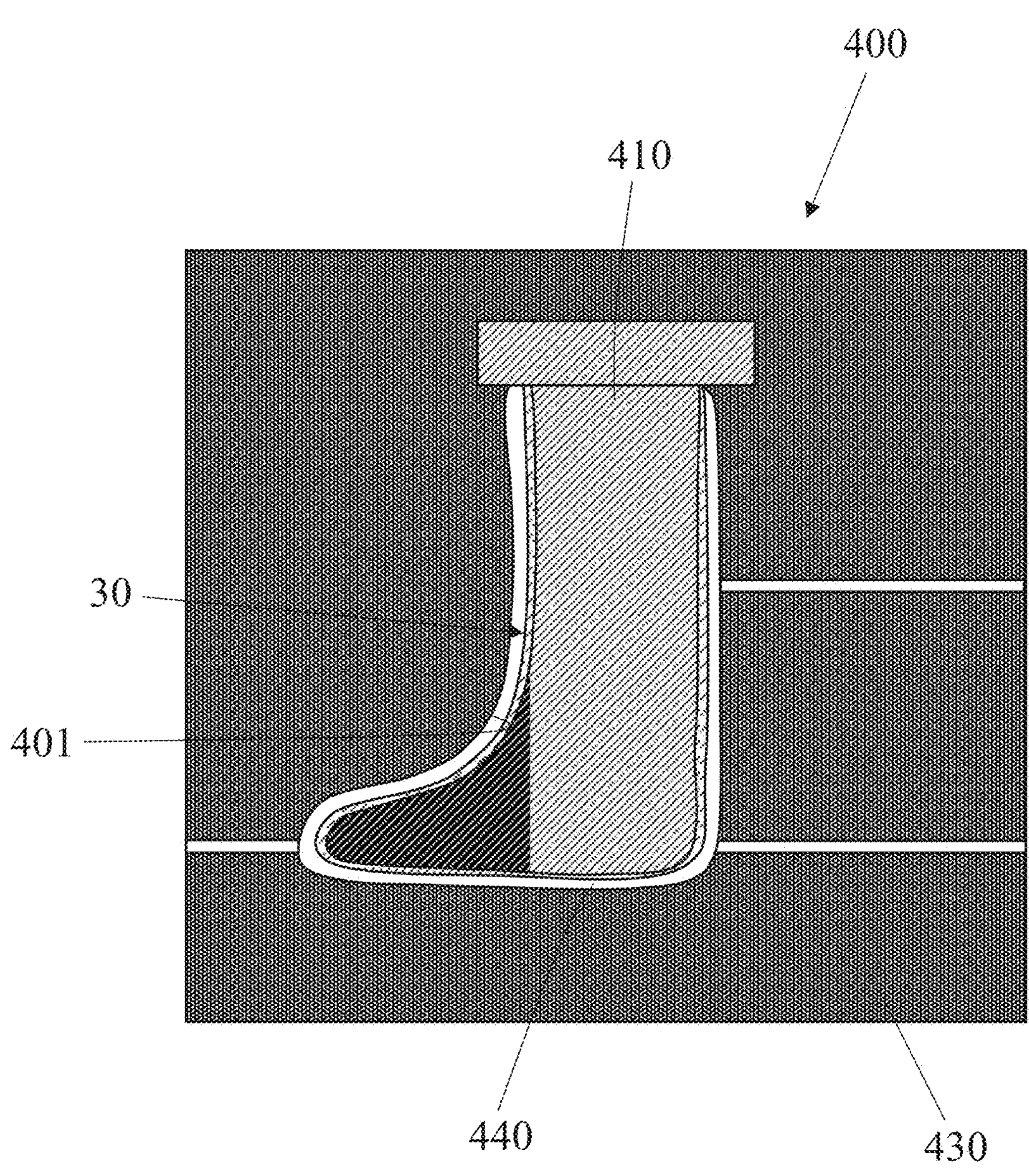
FIG. 8 is a sectional view along the 8-8 line in FIG. 7.
Figure 9:
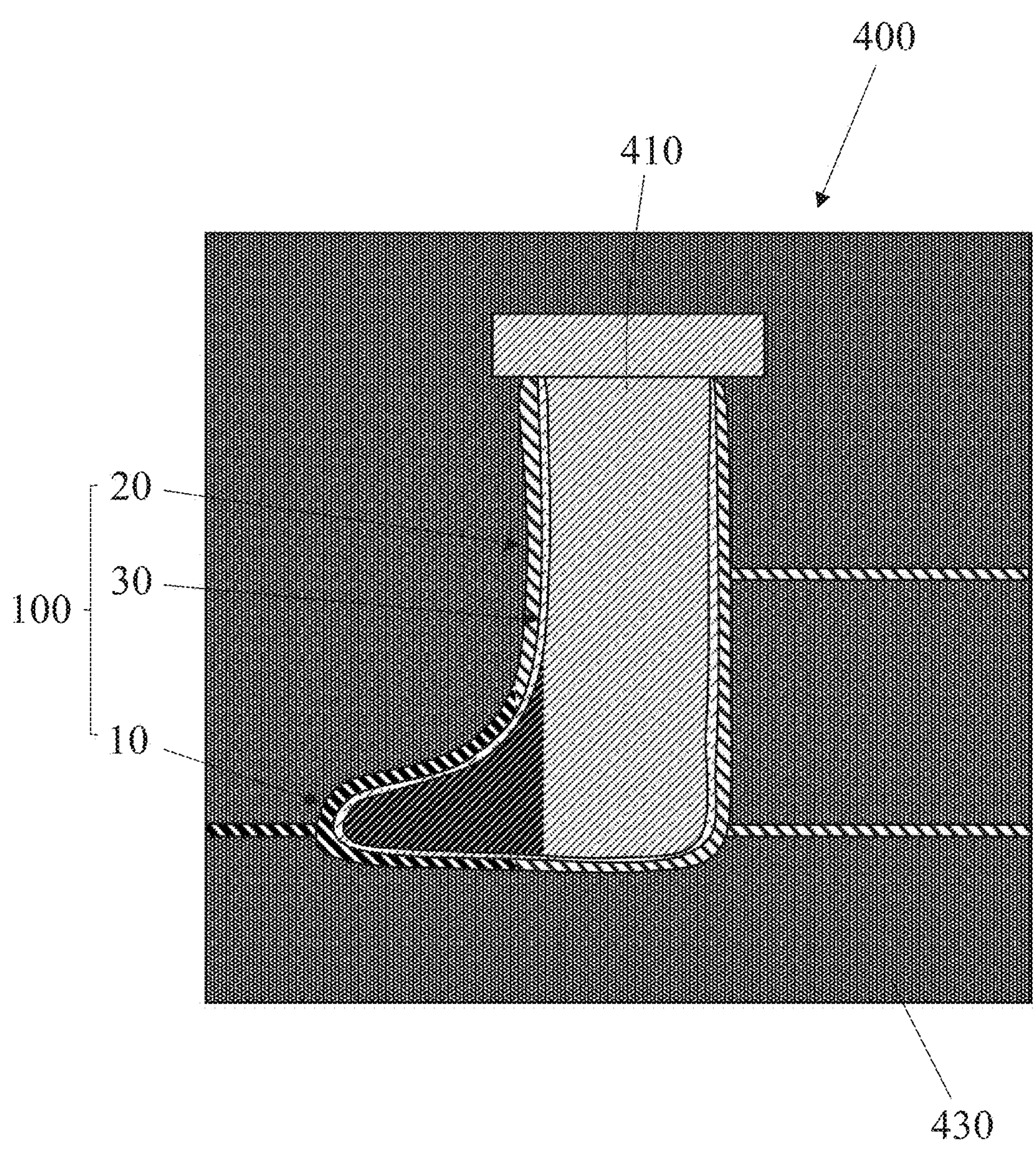
FIG. 9 is a sectional schematic view, showing the injection physical foaming inner boot is formed in the foaming space of the method of manufacturing the inner boot by injection physical foaming according to the embodiment of the present invention.

A method of manufacturing an inner boot by injection physical foaming according to an embodiment of the present invention is illustrated in FIG. 6 and includes using the inner layer 30 of the second embodiment to obtain the injection physical foaming inner boot 200. In other embodiments, the method of manufacturing the inner boot by injection physical foaming could avoid the use of the inner layer 30, thereby obtaining the injection physical foaming inner boot 100 of the first embodiment. The method of manufacturing the inner boot by injection physical foaming includes steps of:

Step S1: place a last 410 in a foaming mold 400 and close the foaming mold 400; the foaming mold 400 includes a top mold 420 and a bottom mold 430; a gap is provided between the last 410 and a mold cavity 401 of the foaming mold 400 to form a foaming space 440; in the current embodiment, the method of manufacturing the inner boot by injection physical foaming further includes lasting the inner layer 30 around the last 410 before the last 410 is placed in the foaming mold 400; referring to FIG. 7 and FIG. 8, after the inner layer 30 is lasted around the last 410 of the foaming mold 400, the last 410 with the lasted inner layer 30 is fixed in the bottom mold 430 of the foaming mold 400 and then the foaming mold 400 is activated to close the bottom mold 430 and the top mold 420, so that the top mold 420 and the bottom mold 430 surround to form the mold cavity 401 in correspondence with a contour of the last 410, and the foaming space 440 is formed between the lasted inner layer 30 and the mold cavity 401 formed by closing the top mold 420 and the bottom mold 430 of the foaming mold 400;

Step S2: set an air pressure in the foaming space 440 of the foaming mold 400 after the foaming mold 400 is closed and before a thermoplastic foaming fluid is injected into the foaming mold 400, wherein the air pressure ranges between 5 bar and 50 bar; in the current embodiment, the preset air pressure ranges between 5 bar and 20 bar;

Step S3: inject the thermoplastic foaming fluid, which includes a supercritical fluid, in a predetermined amount into the foaming space 440 of the foaming mold 400, wherein the predetermined amount ranges between 10% and 50% of a volume of the foaming space 440; in the current embodiment, the supercritical fluid includes nitrogen or carbon dioxide; as the foaming mold 400 is provided with the preset air pressure in advance, the thermoplastic foaming fluid could maintain an unfoamed state while entering the foaming mold 400;

Step S4: release the air pressure in the foaming mold 400 to foam the thermoplastic foaming fluid through the supercritical fluid to form the injection physical foaming inner boot 200, wherein both the specific gravity of the foot portion 10 and the specific gravity of the shaft portion 20 of the injection physical foaming inner boot 200 range between 0.1 g/cm$^3$ and 0.3 g/cm$^3$; a temperature of the foaming mold 400 ranges between 20° C. and 60° C.; a ratio of the volume of the foaming space 440 of the foaming mold 400 to a volume of the injection physical foaming inner boot 200 ranges between 1:0.98 and 1:1.02; referring to FIG. 9, while the injection physical foaming inner boot 200 is formed by foaming, the inner layer 30 is a fabric, the foot portion 10 of the injection physical foaming inner boot 200 is correspondingly engaged with the inner foot section 31 of the inner layer 30 and the part of the foot portion 10 enters the first pores 311 of the inner foot section 31; at the same time, the shaft portion 20 of the injection physical foaming inner boot 200 is correspondingly engaged with the inner shaft section 32 of the inner layer 30 and the part of the shaft portion 20 enters the second pores 321 of the inner shaft section 32; in this way, the foot portion 10 and the shaft portion 20 simultaneously generate the anchor effect with the inner layer 30, so that the good attachment between the inner layer 30 and foot portion 10 and the good attachment between the inner layer 30 and shaft portion 20 could be achieved without providing an adhesive layer between the inner layer 30 and the foot portion 10 and between the inner layer 30 and the shaft portion 20;

Step S5: withdraw the injection physical foaming inner boot 200 from the foaming mold 400, and dispose the reinforcement members 40 on the outer surface 21 of the shaft portion 20 of the injection physical foaming inner boot 200, wherein the reinforcement members 40 are fixed on the shaft portion 20 through sewing and are engaged with the inextensible region 322 of the inner layer 30, so that the reinforcement members 40 are fixed on the outer surface 21 of the shaft portion 20; however, in other embodiments, step S5 could be omitted; alternatively, the number of the reinforcement member 40 could be at least one; alternatively, the reinforcement member 40 could be omitted.

Figure 10:
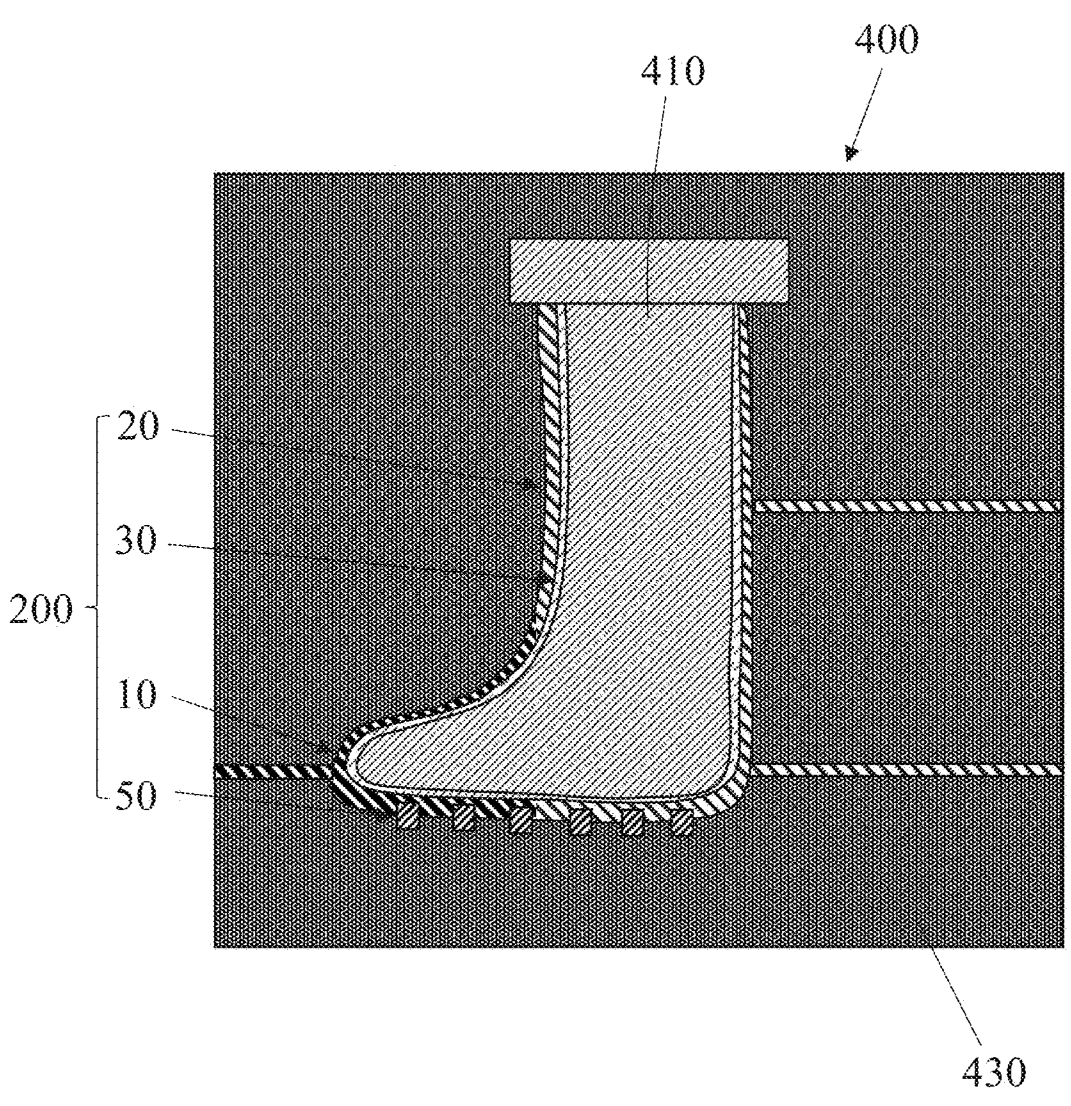
FIG. 10 is a sectional schematic view, showing the anti-slip member is placed in advance in the foaming space of the method of manufacturing the inner boot by injection physical foaming according to another embodiment of the present invention.

Referring to FIG. 8 and FIG. 10, in another embodiment, an anti-slip member 50 could be disposed in the foaming space 440 of the foaming mold 400 in advance in step S1, wherein the anti-slip member 50 is disposed in the mold cavity 401 of the foaming mold 400 and correspondingly faces a bottom of the last 410, so that the anti-slip member 50 and the inner layer 30 are jointly disposed in the foaming space 440; afterwards, step S2 to step S4 are executed, the thermoplastic foaming fluid is injected into the foaming space 440 for performing injection physical foaming, and the anti-slip member 50 is engaged with the bottom surface of the sole 14 of the foot portion 10, thereby obtaining the injection physical foaming inner boot 300.

Therefore, the method of manufacturing the inner boot by injection physical foaming could obtain the injection physical foaming inner boot 100, 200, 300 in a single foaming process through performing injection physical foaming by using the supercritical fluid. In this way, processing procedures, such as roughening surfaces, applying an adhesive, attaching a sole, etc., could be avoided, thereby improving the production efficiency and increasing the yield rate of the injection physical foaming inner boot 100, 200, 300. Moreover, the method of manufacturing the inner boot by injection physical foaming does not include adding a chemical crosslinking agent and a chemical foaming agent, so that the foot portion 10 and the shaft portion 20 of the injection physical foaming inner boot 100, 200, 300 could be directly recycled and reused and non-recyclable waste produced during the manufacturing process could be reduced, thereby making the manufacturing process environmentally friendly.

It must be pointed out that the embodiment described above is only a preferred embodiment of the present invention. All equivalent methods and structures which employ the concepts disclosed in this specification and the appended claims should fall within the scope of the present invention.

What is claimed is:

1. An injection physical foaming inner boot, comprising:

a foot portion, comprising a forefoot section and a hindfoot section, wherein a hardness of the forefoot section is greater than a hardness of the hindfoot section; and a shaft portion, extending upwards from the hindfoot section of the foot portion, wherein the foot portion and the shaft portion are integrally formed; both the foot portion and the shaft portion include a thermoplastic material and do not include a crosslinking agent and a chemical foaming agent; both a specific gravity of the foot portion and a specific gravity of the shaft portion range between 0.1 g/cm$^3$ and 0.3 g/cm$^3$; the hardness of the forefoot section is greater than a hardness of the shaft portion;

an inner layer, wherein the inner layer comprises an inner foot section and an inner shaft section; the inner foot section is correspondingly engaged with an inner surface of the foot portion; the inner shaft section is correspondingly engaged with an inner surface of the shaft portion, wherein an extensible region and an inextensible region are defined on the inner layer; the extensible region is distributed on a part of the inner shaft section and a part of the inner foot section, the inextensible region is distributed on another part of the inner shaft section and another part of the inner foot section; an area of the inextensible region of the inner shaft section is less than an area of the extensible region of the inner shaft section; an area of the inextensible region of the inner foot section is less than an area of the extensible region of the inner foot section; the inextensible region of the inner shaft section is larger than the inextensible region of the inner foot section; and at least one reinforcement member disposed on an outer surface of at least one of the shaft portion or the foot portion, when the at least one reinforcement member is fixed on the outer surface of the shaft portion, the at least one reinforcement member is fixed on the shaft portion through sewing and is engaged with the inextensible region of the inner layer; when the at least one reinforcement member is fixed on the outer surface of the foot portion, the at least one reinforcement member is fixed on the foot portion through sewing and is engaged with the inextensible region of the inner layer.

2. The injection physical foaming inner boot as claimed in claim 1, wherein the inner layer is a fabric, the inner layer has a plurality of first pores distributed no the inner foot section; the inner layer has a plurality of second pores distributed on the inner shaft section; a part of the foot portion enters the plurality of first pores of the inner foot section; a part of the shaft portion enters the plurality of second pores of the inner shaft section; no adhesive layer is provided between the inner foot section and between the inner shaft section and the shaft portion.

3. The injection physical foaming inner boot as claimed in claim 1, further comprising an anti-slip member, wherein the anti-slip member is disposed on the foot portion of the injection physical foaming inner boot; the foot portion has an upper and a sole; the upper is connected to the periphery of the sole; the anti-slip member is engaged with a bottom surface of the sole of the foot portion.

4. The injection physical foaming inner boot as claimed in claim 1, wherein the thermoplastic material is selected from a group consisting of polyolefin, polyester, thermoplastic polyurethane (TPU), nylon, and a combination thereof.

5. The injection physical foaming inner boot as claimed in claim 1, wherein the thermoplastic material of the forefoot section, the hindfoot section, and the shaft portion are identical; an average thickness of the forefoot section is less than an average thickness of the hindfoot section and less than an average thickness of the shaft portion, such that a pore density of the forefoot section generated by foaming is high and a pore density of both the hindfoot section and the shaft portion generated by foaming are less than the pore density of the forefoot section.

6. The injection physical foaming inner boot as claimed in claim 1, wherein a hardness of the thermoplastic material of the forefoot section is greater than a hardness of the thermoplastic material of the hindfoot section and greater than a hardness of the thermoplastic material of the shaft portion.

7. The injection physical foaming inner boot as claimed in claim 2, wherein a tensile strength of the inextensible region is greater than a tensile strength of an extensible region.

8. The injection physical foaming inner boot as claimed in claim 7, wherein the extensible region and the inextensible region are woven materials comprising different fibers.

9. The injection physical foaming inner boot as claimed in claim 7, wherein the and the inextensible region are woven materials comprising different weaving patterns.

10. The injection physical foaming inner boot as claimed in claim 2, wherein the inner layer is provided with fabric loops on both the inner foot section and the inner shaft section, improving engagement strengths between the inner layer and the foot portion and between the inner layer and the shaft portion.

11. The injection physical foaming inner boot as claimed in claim 3, wherein the anti-slip member comprises a plurality of anti-slip blocks.

12. The injection physical foaming inner boot as claimed in claim 11, wherein the plurality of anti-slip blocks correspond to and are disposed in a plurality of recesses distributed on the bottom surface of the sole and protrude outwards relative to the bottom surface of the sole.

13. The injection physical foaming inner boot as claimed in claim 1, wherein the physical foaming imparted by a supercritical fluid.

14. The injection physical foaming inner boot as claimed in claim 13, wherein the supercritical fluid comprises nitrogen or carbon dioxide.

* * * * *